United States Patent
Lee et al.

(10) Patent No.: US 10,873,854 B2
(45) Date of Patent: Dec. 22, 2020

(54) METHOD AND APPARATUS FOR ESTABLISHING CONNECTION OF DEVICES

(71) Applicant: LG ELECTRONICS INC., Seoul (KR)

(72) Inventors: Minsoo Lee, Seoul (KR); Jingu Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/321,368

(22) PCT Filed: Jul. 28, 2017

(86) PCT No.: PCT/KR2017/008172
§ 371 (c)(1),
(2) Date: Jan. 28, 2019

(87) PCT Pub. No.: WO2018/021877
PCT Pub. Date: Feb. 1, 2018

(65) Prior Publication Data
US 2019/0166490 A1    May 30, 2019

Related U.S. Application Data

(60) Provisional application No. 62/367,649, filed on Jul. 28, 2016.

(51) Int. Cl.
*H04W 12/00* (2009.01)
*H04W 76/14* (2018.01)
(Continued)

(52) U.S. Cl.
CPC ........... *H04W 12/00305* (2019.01); *H04W 12/04031* (2019.01); *H04W 52/0206* (2013.01);
(Continued)

(58) Field of Classification Search
None
See application file for complete search history.

(56) References Cited

U.S. PATENT DOCUMENTS

| 2015/0222517 A1* | 8/2015 | McLaughlin | ....... H04L 63/0435 |
| | | | 713/156 |
| 2015/0245220 A1* | 8/2015 | Williamson | ........ H04W 12/003 |
| | | | 370/329 |

(Continued)

FOREIGN PATENT DOCUMENTS

| KR | 10-1363586 B1 | 2/2014 |
| WO | WO 2015/069093 A1 | 5/2015 |
| WO | WO 2015/194854 A1 | 12/2015 |
| WO | WO 2016/017908 A1 | 2/2016 |

*Primary Examiner* — Gregory B Sefcheck
*Assistant Examiner* — Amarnauth G Persaud
(74) *Attorney, Agent, or Firm* — Birch, Stewart, Kolasch & Birch LLP

(57) ABSTRACT

Disclosed is a method and apparatus for establishing a connection of a wireless communication interface between a client and a server using Bluetooth Low Energy (LE). According to the present invention, a client, receives, from the server, a first advertising message including at least one of first state information indicating a state of main power of the server and second state information indicating a state of a specific wireless communication interface, performs an activation procedure of the main power based on the first state information, transmits, to the server, a first write request message requesting writing of a first operation code of control point property for activating the specific wireless communication interface; receiving a first write response message in response to the first write request message, receives, from the server, a first indication message including a first result code indicating whether the specific wireless communication interface is activated, and establishes a (Continued)

connection with the specific wireless communication interface, when the specific wireless communication interface is activated.

8 Claims, 19 Drawing Sheets

(51) Int. Cl.
*H04W 76/11* (2018.01)
*H04W 12/04* (2009.01)
*H04W 52/02* (2009.01)
*H04W 84/18* (2009.01)
*H04W 88/06* (2009.01)

(52) U.S. Cl.
CPC ............ *H04W 76/11* (2018.02); *H04W 76/14* (2018.02); *H04W 84/18* (2013.01); *H04W 88/06* (2013.01); *Y02D 30/70* (2020.08)

(56) References Cited

U.S. PATENT DOCUMENTS

| | | | |
|---|---|---|---|
| 2015/0296073 A1* | 10/2015 | Lo | H04W 4/80 455/41.2 |
| 2016/0127883 A1* | 5/2016 | Zhou | H04W 8/005 455/41.1 |
| 2017/0223579 A1* | 8/2017 | Lee | H04W 52/028 |
| 2017/0289038 A1* | 10/2017 | Weizman | H04L 49/252 |

* cited by examiner

Fig. 13

| Fields | | | Data Type | Size (octets) | specific data |
|---|---|---|---|---|---|
| AD Type (TDS) | | | uint8 | 1 | 0x 26 《TDS AD type》 |
| AD Data | Organization ID | | uint8 | 1 | 0x 01 《Bluetooth SIG 》 |
| | TDS Flags | | 8bit | 1 | 0x 0a ( 0b 000 01 0 10 )<br>3 bits  2 bits    1 bit    2bits<br>《 Device Power State \| Transport State \|Transport Data Incomplete \| Role 》<br>0b000 (= Device is OFF or 0b001 = Device is ON or 0b010 = Device is in Sleep Mode )<br>0b01 = Carrier State is On and Available<br>0b0 = Carrier Date Incomplete is FALSE<br>0b10 = Provider Role only |
| | Length | | uint8 | 1 | 0x 06 |
| | Transport Data | Length | uint8 | 1 | 0x 05 |
| | | Type | uint8 | 1 | 0x 01 《16 - bit Service UUID List 》 |
| | | Value #1 | List of 《Service UUID》 | 2, 4, or 16 | 0x110B 《A2DP SINK》 |
| | | Value #1 | List of 《Service UUID》 | 2, 4, or 16 | 0x111E 《HF》 |
| | Organization ID | | uint8 | 1 | 0x FF 《 Wi - Fi 》 |
| | TDS Flags | | 8bit | 1 | 0b 10 0 ?? 000<br>2 bit    1 bit    2 bit<br>《 Provider Role \| Additional frame data \| Wi - Fi State 》 |
| | Transport Data | Length | uint8 | 1 | 0x 09 |
| | | Type | uint8 | 1 | 0x 02 《Wi - Fi AP》 |
| | | Value | uint8 | 1 | 0x 00 《None》<br>Device Type |
| | | | 8bit | 1 | 0b 1 0 0 00000<br>2 bit    1 bit    1 bit    1 bit    3 bit<br>《Wi - Fi state \| Factory Mode \| Current Wi - Fi Mode \| OSC (Cl Only) \| Wi - Fi Connection count 》<br>0: Soft AP, 1: Over AP |
| | | | byte | 6 | 0x xx xx xx xx xx xx 《Serial Least 6 bytes for Wi - Fi SSID Generation》 |

Fig. 14

| Specification Name (Service Name) | Specification Type | Assigned Number (UUID) |
|---|---|---|
| Transport Discovery | org.bluetooth.service.transport_discovery | 0x 1824 |

(a) Service

| Characteristics Name | UUID | Properties | Permissions | Description |
|---|---|---|---|---|
| Device Power State | 0x 2FFF (TBD) | Read | Read | To obtain Device Power state (ON, OFF, Sleep Mode) |
| Wi-Fi Handover Data | 0x 2D01 (TBD) | Read | Read | To obtain Wi-Fi Pass Phrase |
| Wi-Fi Alliance Data | 0x 2D02 (TBD) | None | None | |
| Complete Wi-Fi Transport Data Descriptor | 0x 2D03 (TBD) | Read | Read | |
| Control Point | 0x 2ABC | Write \| Indicate | Write \| Indicate | To trigger Device, BR/EDR, Wi-Fi Interface ON |

(b) Characteristic

Fig. 15

| Fields | Data Type | Size (Octets) | Requirement |
|---|---|---|---|
| Op Code (See Table) | uint8 | 1 | M |
| Organization ID | uint8 | 1 | M |
| Parameter | Variable | 0 to 19 octets | O |

(a) Control Point

| Op Code Value | Procedure | Requirement | Organization ID | Parameter |
|---|---|---|---|---|
| 0x00 | Reserved for Future Use | | | |
| 0x01 | Activate Transport | M | This field shall contain the relevant 1 octet Organization ID. | This field shall contain relevant transport-specific data up to 19 octets |
| 0x02 | Activate Device (Turn Power ON) | M | This field shall contain the relevant 1 octet Organization ID. | This field shall contain relevant Device Power-specific data up to 19 octets |
| 0x03-0xFF | Reserved for Future Use | | | Interface ON |

(b) Op Code

Fig. 18
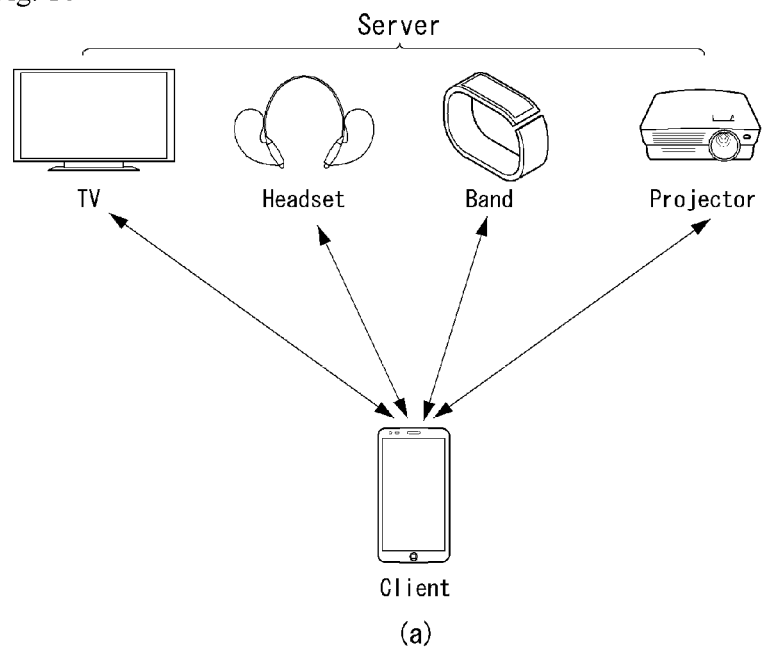
(a)
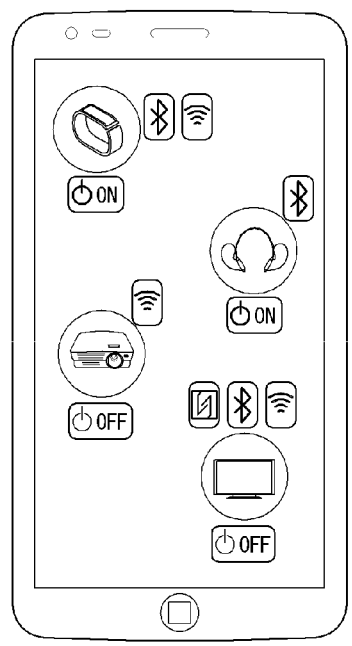
(b)

METHOD AND APPARATUS FOR ESTABLISHING CONNECTION OF DEVICES

CROSS REFERENCE TO RELATED APPLICATIONS

This application is the National Phase of PCT International Application No. PCT/KR2017/008172, filed on Jul. 28, 2017, which claims priority under 35 U.S.C. 119(e) to U.S. Provisional Application No. 62/367,649, filed on Jul. 28, 2016, all of which are hereby expressly incorporated by reference into the present application.

TECHNICAL FIELD

The present invention relates to a method and apparatus for establishing a connection between devices in a wireless communication system, and more particularly, to a method and apparatus for establishing a connection between devices using the Bluetooth technique.

BACKGROUND ART

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

Recent smart devices such as a Smart phone and a Smart TV are mounted with a plurality of wireless communication interfaces such as Wi-Fi, Bluetooth, NFC, and the like, and the interfaces are actively used in different purposes according to Use-Case of a user.

However, it is difficult to anticipate when a connection is generated with a counterpart device through the various wireless communication interfaces, and owing to such a practical problem, the main power of a device is turned on always in most home appliances and personal devices, and thus, a plurality of wireless communication interfaces needs to maintain Wake-up state always.

Most wireless devices and communication interfaces use a method for minimizing standby power in idle times, but there is a problem that devices maintain Wake-up state continuously, and accordingly, a constant power is persistently consumed.

Accordingly, there is a limitation to maintain all wireless communication interfaces in Wakeup state continuously, and such a problem becomes more serious in Energy-Constraint devices such as a Smart phone, a Smart watch, and so on.

Therefore, in order to solve the problem, in the present invention, a method is required for operating even in the case that the main power of a device is turned off, maintaining only a specific wireless communication interface that consumes low power in Wake-up state always, and Waking-up the main power and the other wireless communication interfaces only if it is required.

The technical objects to attain in the present invention are not limited to the above-described technical objects and other technical objects which are not described herein will become apparent to those skilled in the art from the following description.

Technical Solution

In order to solve the technical problem, the present invention provides a method for a first device to control a second device using Bluetooth technique.

Particularly, a method for a first device to control a second device by using the Bluetooth technique according to an embodiment of the present invention includes receiving, from the server, a first advertising message including at least one of first state information indicating a state of main power of the server and second state information indicating a state of a specific wireless communication interface; performing an activation procedure of the main power based on the first state information; transmitting, to the server, a first write request message requesting writing of a first operation code of control point property for activating the specific wireless communication interface; receiving a first write response message in response to the first write request message; receiving, from the server, a first indication message including a first result code indicating whether the specific wireless communication interface is activated; and establishing a connection with the specific wireless communication interface, when the specific wireless communication interface is activated.

In addition, in the present invention, the advertising message further includes at least one of an identifier indicating the specific wireless communication interface or a service Universal Unique Identifier (UUID) indicating a service available to be provided through the specific wireless communication interface.

In addition, in the present invention, the step of performing an activation procedure includes: establishing the Bluetooth LE connection with the server; transmitting, to the server, a second write request message requesting writing of a second operation code of the control point for activating the main power; receiving, from the server, a second write response message in response to the second write request message; and receiving, from the server, a second indication message including a second result code indicating whether the main power is activated.

In addition, in the present invention, the step of activating the main power includes: transmitting, to the server, a second advertising message including a specific code indicating the activation of the main power; receiving, from the server, a third advertising message including third state information indicating a power state of the main power; and establishing the Bluetooth LE connection with the server.

In addition, the present invention further includes establishing a bonding with the server; generating a first arbitrary address for identifying the client; and exchanging a second arbitrary address for identifying the first arbitrary address from the server with the server.

In addition, the present invention further includes generating the specific code; and transmitting, to the server, a message including code information indicating that the generated specific code indicates the activation of the main power.

In addition, in the present invention, the first advertising message further includes list information indicating at least one wireless communication interface except the Bluetooth LE supported by the server and service information indicating a service available to be provided using each of the at least one wireless communication interface.

In addition, a method for establishing a connection of wireless interface using Bluetooth Low Energy (LE) according to the present invention, the method performed by a client and a server includes receiving, by the client, a first advertising message including at least one of first state information indicating a state of main power of the server and second state information indicating a state of a first specific wireless communication interface; activating, by the server, the main power based on the first state information; transmitting, to the client, a first write request message requesting writing of a first operation code of control point property for activating the first specific wireless communication interface; requesting, by a Bluetooth LE module of the server, an activation to a first specific wireless communication interface module; receiving, by the client, a first write response message in response to the first write request message from the server; informing, by the first specific wireless communication interface module, an activation to the Bluetooth LE module, after the first specific wireless communication interface module is activated; receiving, from the server, a first indication message including a first result code indicating whether the first specific wireless communication interface is activated; and establishing a connection between the first specific wireless communication interface and a second specific wireless communication interface of the client, when the first specific wireless communication interface is activated.

In addition, a client for establishing a connection of wireless interface with a server using Bluetooth Low Energy (LE) according to the present invention includes a communication unit for communicating with exterior in wireless or wired manner; and a processor functionally connected to the communication unit, and the processor is configured to: receive, from the server, a first advertising message including at least one of first state information indicating a state of main power of the server and second state information indicating a state of a specific wireless communication interface; perform an activation procedure of the main power based on the first state information; transmit, to the server, a first write request message requesting writing of a first operation code of control point property for activating the specific wireless communication interface; receive a first write response message in response to the first write request message; receive, from the server, a first indication message including a first result code indicating whether the specific wireless communication interface is activated; and establish a connection with the specific wireless communication interface, when the specific wireless communication interface is activated.

Technical Effects

According to a method for establishing a connection between devices according to an embodiment of the present invention, there is an effect of establishing a connection with other wireless communication interface through Bluetooth.

In addition, according to the present invention, the main power states of devices and the power states of wireless communication interfaces are checked using Bluetooth technique, and there is an effect of checking whether a connection of a wireless communication interface is established immediately.

In addition, according to the present invention, the main power states of devices and the power states of wireless communication interfaces are checked, and accordingly, when the main power of the device and the power of the wireless communication interface are inactivated, there is an effect of establishing a connection by activating the main power and the power of the wireless communication interface.

In addition, according to the present invention, the power of other wireless communication interfaces except Bluetooth are activated only when the wireless communication interfaces are connected, and there is an effect that power consumption may be decreased.

The technical effects in the present invention are not limited to the above-described technical effects and other technical effects which are not described herein will become apparent to those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIGS. 13 to 15 are diagrams illustrating an example of a message and the property proposed in the present disclosure.

FIG. 18 is a diagram illustrating an example of a method for controlling a power state of a device proposed in the present disclosure.

BEST MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
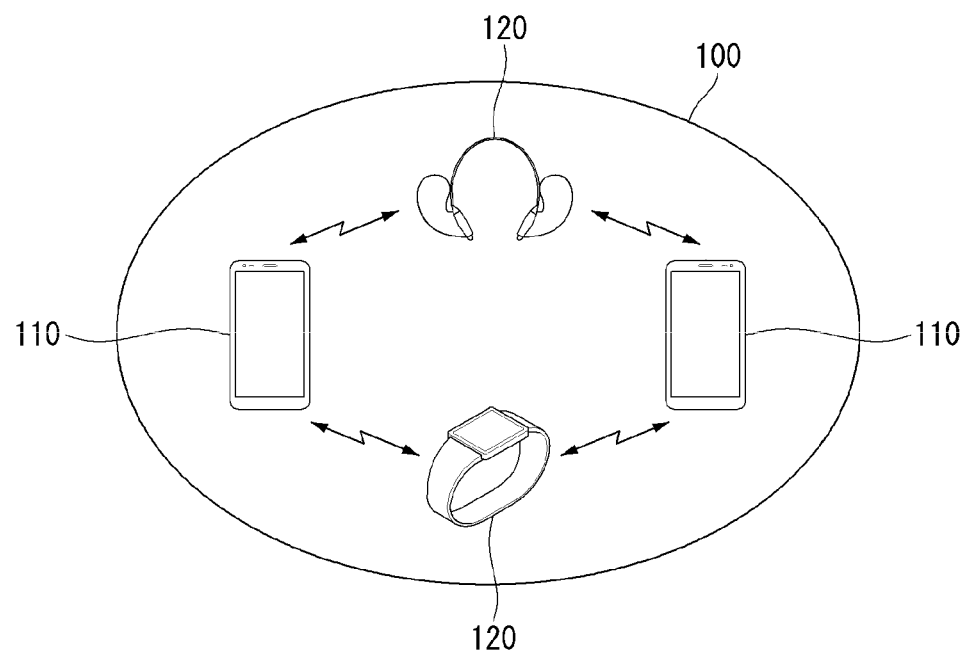
FIG. 1 is a schematic diagram illustrating an example of a wireless communication system using a Bluetooth low energy technology proposed in this specification.

FIG. 1 is a schematic diagram illustrating an example of a wireless communication system using Bluetooth low energy technology proposed in the specification.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other devices, and the client device may operate as a servicer device in a relationship with other devices. That is, in BLE communication system, any one device may operate as a server device or a client device, and if it is required, may operate as a server device and a client device simultaneously.

The server device 120 may also be represented as a data service device, a slave device, a slave, a server, a conductor, a host device, a gateway, a sensing device, a monitoring device, a first device, a second device, and the like.

The client device 10 may also be represented as a master device, a master, a client, a member, a sensor device, a sink device, a collector, a third device, a fourth device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
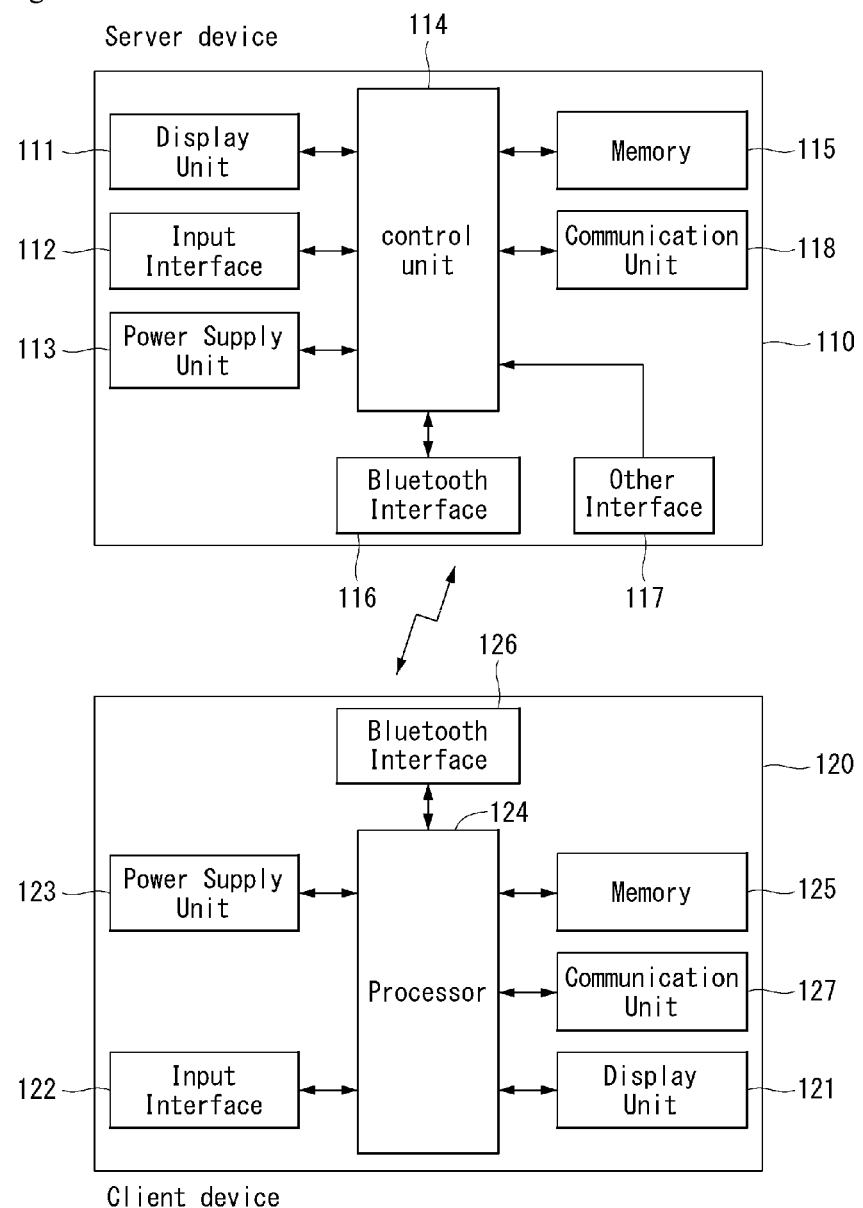
FIG. 2 is a block diagram of a device capable of realizing methods proposed in the specification.

FIG. 2 is a block diagram of a device capable of realizing methods proposed in the specification.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 127.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 125 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 and 125 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules which receive external power and internal power and provide power necessary for operation of components under the control of the processor.

As described above, BLE technology has a small duty cycle and can remarkably reduce power consumption through a low data rate.

The input units 112 and 122 refer to modules which provide user input through a screen button, for example, to the controller such that the user can control device operation.

Figure 3:
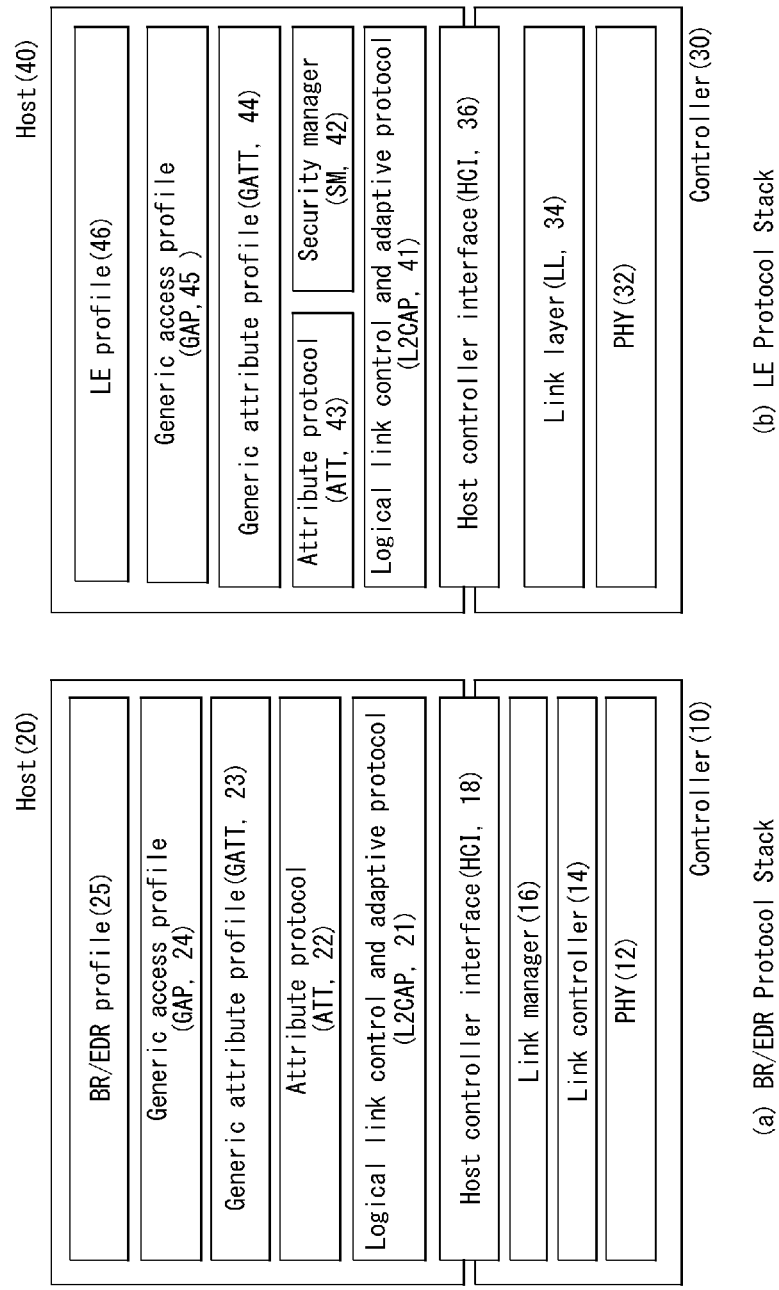
FIG. 3 illustrates an example of a Bluetooth communication architecture to which the methods proposed in the specification are applicable.

FIG. 3 illustrates an example of a Bluetooth communication architecture to which methods proposed in this specification are applicable.

Referring to FIG. 3, FIG. 3(a) illustrates an example of a Bluetooth BR (Basic Rate)/EDR (Enhanced Data Rate) protocol stack and FIG. 3(b) illustrates an example of a Bluetooth LE (Low Energy) protocol stack.

Specifically, as illustrated in FIG. 3(a), the Bluetooth BR/EDR protocol stack may include a controller stack 10 and a host stack 20 above and below a host controller interface (HCI) 18.

The host stack (or host module) 20 refers to hardware for transmitting or receiving Bluetooth packets to or from a wireless transceiver module receiving 2.4 GHz Bluetooth signals and is connected to the Bluetooth module corresponding to the controller stack 10 to control the Bluetooth module and perform operations.

The controller stack 10 may include a PHY layer 12, a link controller layer 14 and a link manager layer 16.

The PHY layer 12 transmits and receives 2.4 GHz radio signals and can hop 79 RF channels and transmit data when GFSK (Gaussian Frequency Shift Keying) modulation is used.

The link controller layer 14 serves to transmit digital signals, selects a channel sequence hopping 1400 times per second and transmits a 625 μs time slot per channel.

The link manager layer 16 controls overall operations (link setup, control and security) of Bluetooth connection using LMP (Link Manager Protocol).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

Figure 4:
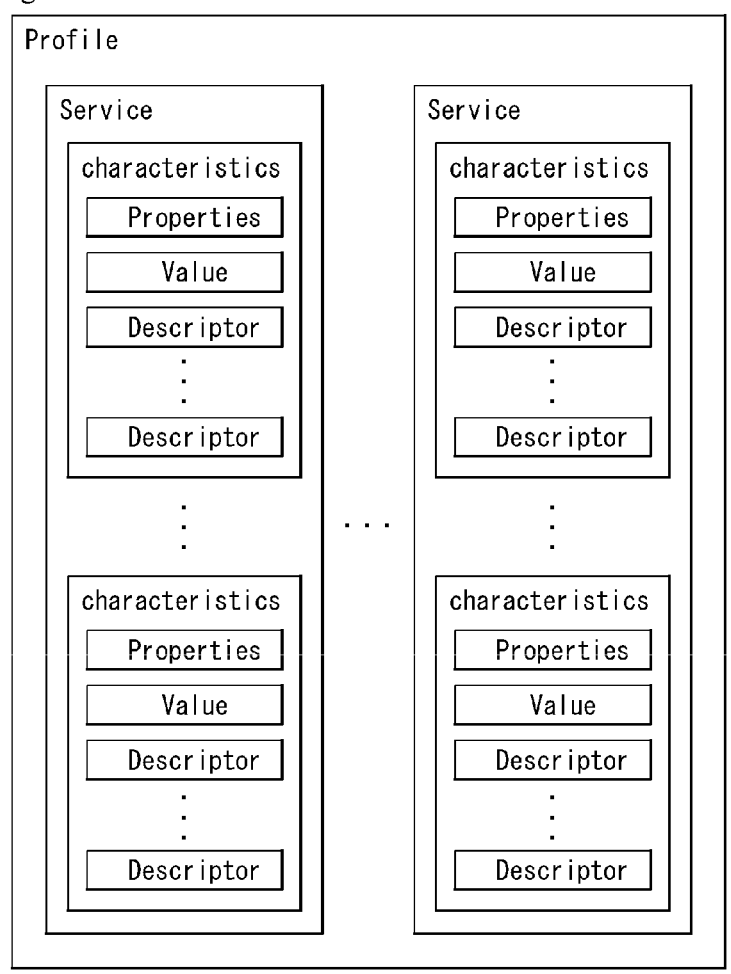
FIG. 4 illustrates an example of a structure of a GATT (Generic Attribute Profile) of Bluetooth low energy.

As illustrated in FIG. 4(*b*), the Bluetooth LE protocol stack includes a controller stack 30 operable to process a wireless device interface for which timing is important and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

The host stack may be implemented as part of an OS operated on a processor module or may be implemented as instantiation of a package on the OS.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, a description will be given of procedures of the BLE technology.

The BLE procedures may be classified into a device filtering procedure, an advertising procedure, a scanning procedure, a discovery procedure and a connection procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 4 illustrates an example of a structure of a GATT (Generic Attribute Profile) of Bluetooth low energy.

Referring to FIG. 4, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

Figure 5:
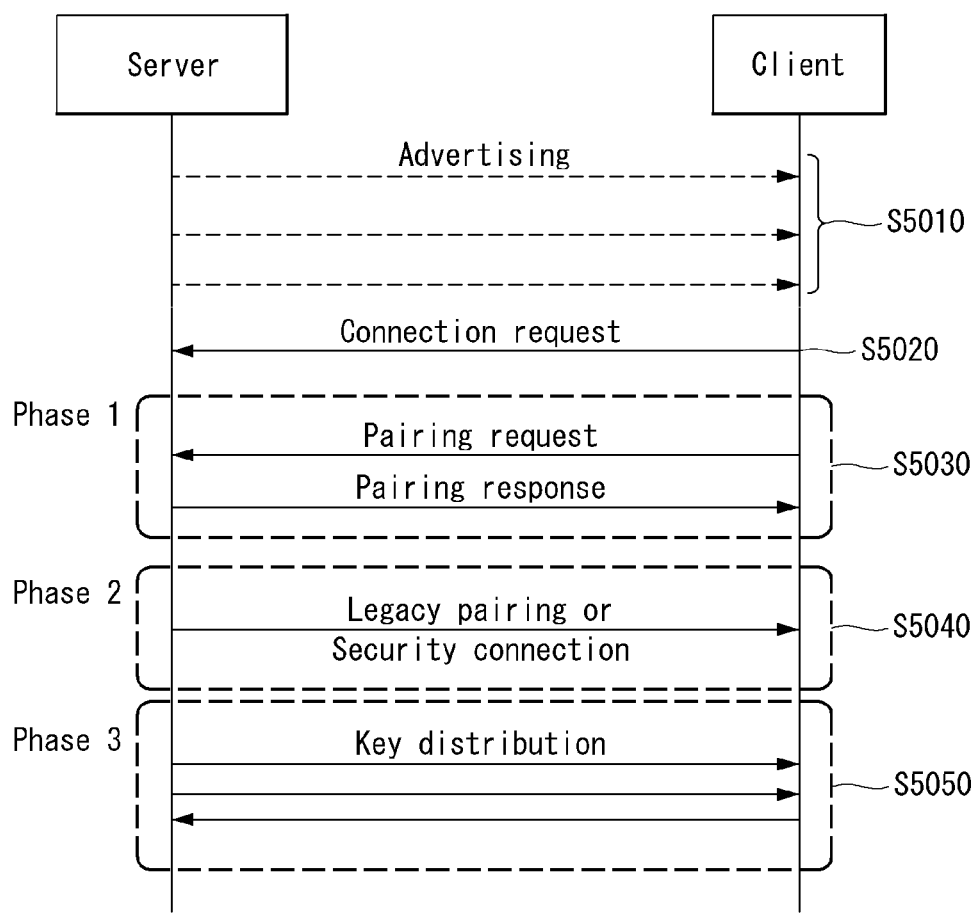
FIG. 5 is a flowchart illustrating an example of a connection procedure method in Bluetooth low power energy technique to which the present invention may be applied.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute FIG. 5 is a flowchart illustrating an example of a connection procedure method in Bluetooth low power energy technique to which the present invention may be applied.

A server transmits an Advertising message through three advertising channel to a client (step, S5010).

The server may be called an Advertiser before a connection is established, and called a Master after a connection is established. An example of the server includes a sensor (temperature sensor, etc.).

In addition, the client may be called a Scanner before a connection is established, and called a Slave after a connection is established. An example of the client includes a Smart phone.

As described above, Bluetooth performs a communication by dividing total 40 channels through 2.4 GHz band. Three channels among 40 channels are Advertising channels, and used for exchanging packets exchanged for establishing a connection, such as various kinds of Advertising packets.

The remaining 37 channels are data channels and used for exchanging data after a connection is established.

The client may transmit a Scan Request message to the server in order to obtain additional data (e.g., server device name, etc.), after receiving the Advertising message.

In this case, the server transmits a Scan Response message including additional data in response to the Scan Request message to the client.

Here, the Scan Request message and the Scan Response message are types of the Advertising packet, and the Advertising packet may include User Data of 31 bytes or smaller only.

Accordingly, in the case that data of which size of data is greater than 3 bytes is existed but the overhead of the data is too great to send with establishing a connection, the data is sent via two times by using the Scan Request message/the Scan Response message.

Next, the client transmits a Connection Request message for Bluetooth connection configuration with the server to the server (step, S5020).

Through this, Link Layer (LL) connection is established between the server and the client.

Later, the server and the client perform a security establishment procedure.

The security establishment procedure may be interpreted as Secure Simple Pairing or performed by including it.

That is, the security establishment procedure may be performed throughout Phase 1 step to Phase 3 step.

Particularly, a pairing procedure (Phase 1) is performed between the server and the client (step, S5030).

In the pairing procedure, the client transmits a Pairing Request message to the server, and the server transmits a Pairing Response message to the client.

Through the pairing procedure, authentication requirements, I(Input)/O(Output) capabilities and Key Size information are exchanged between devices. Through this information, in Phase 2, it is determined a type of Key generation method.

Next, in Phase 2, legacy pairing or security connection is performed between the server and the client (step, S5040).

In Phase 2, Temporary Key and Short Term Key (STK) of 128 bits are generated for performing legacy pairing.

Temporary Key: A key made for generating STK
Short Term Key (STK): A key value used for making an Encrypted connection between devices In the case that a security connection is performed in Phase 2, Long Term Key (LTK) of 128 bits is generated.

Long Term Key (LTK): A key value used in a later connection as well as in an Encrypted connection between devices Next, in SSP Phase 3, a Key Distribution procedure is performed between the server and the client (step, S5050).

Through this, a security connection between the server and the client is established, and data may be transmitted and received by establishing an encrypted link.

The present invention proposes a method for decreasing power consumption of a device by maintaining only Bluetooth LE hat consumes low power in Wake-up state and activating the main power of the device and the other wireless communication interfaces from OFF state only if it is required.

Figure 6:
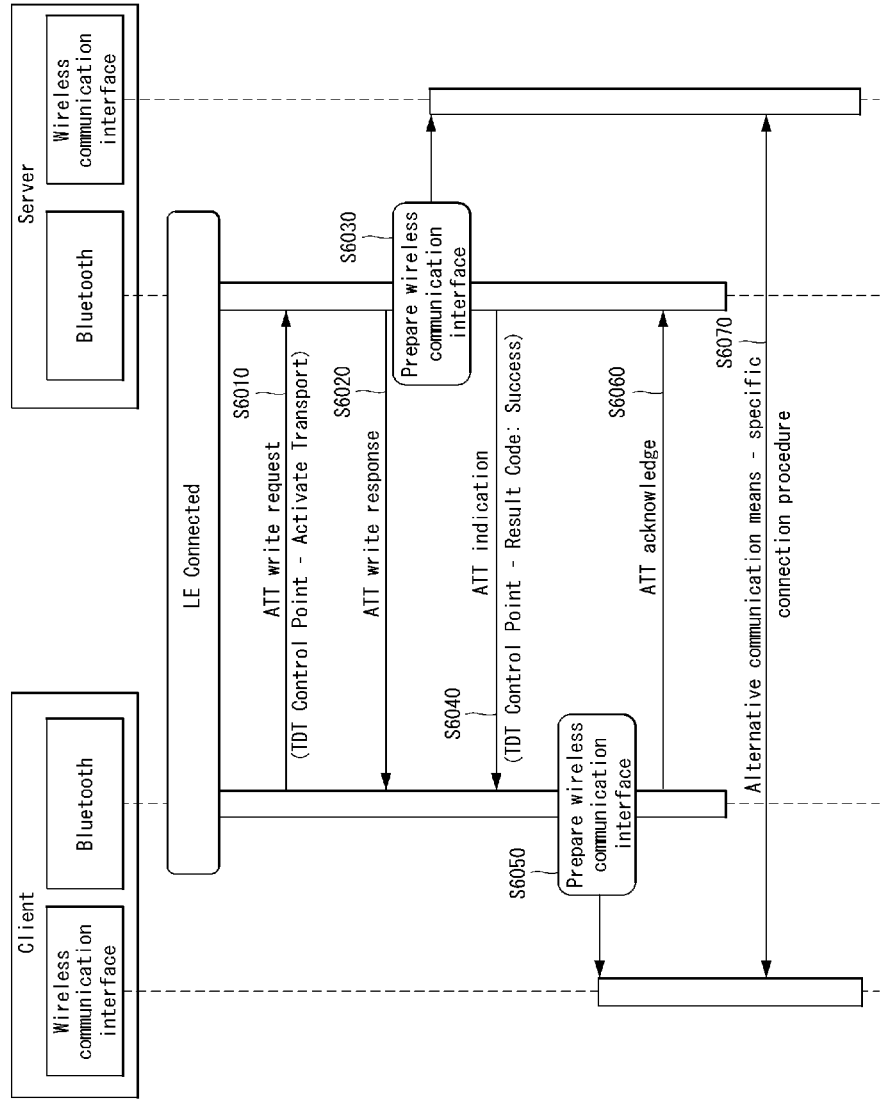
FIG. 6 is a flowchart illustrating an example of a method for discovering a communication means of a device to which the present invention may be applied.

FIG. 6 is a flowchart illustrating an example of a method for discovering a communication means of a device to which the present invention may be applied.

Referring to FIG. 6, a client may know wireless communication means supported by a server except Bluetooth LE through Bluetooth LE, and activate wireless communication interface communication means which is inactivated and establish a connection of the activated wireless communication interface communication means.

Hereinafter, the service of discovering a wireless communication network through Bluetooth LE as such and establishing a connection by activation is referred to as Transport Discovery Service (TDS).

At this time, the wireless communication interface may be called as Transport, wireless communication network or alternative communication means, and the like.

Particularly, the client and the server establish a Bluetooth LE connection through the method described in FIG. 5. At this time, the client may know the wireless communication interface (e.g., Wi-Fi, Bluetooth BR/EDR, NFC, Zigbee, etc.) that is supported by the server through an Advertising message transmitted from the server.

That is, the server may transmit the Advertising message with information indicating the wireless communication interface supported by the server itself except Bluetooth LE being included, and the client may identify the wireless communication interface supported the server through the information included in the Advertising message transmitted from the server.

In the case that the wireless communication interface of the server is inactivated, in order to request activation of the wireless communication interface, the client transmits a Write request message that requests writing of an operation code to TDS control point property (step, S6010).

The server transmits a Write response message in response to the Write request message to the client (step, S6020). The server activates the wireless communication interface and configures as connection-ready state (step, S6030).

The server transmits an indication message to the client and informs that the wireless communication interface is activated and configured as connection-ready state.

For example, the server transmits an indication message of which Result code for the control point requested from the client is configured as 'Success' to the client (step, S7040).

The client may identify that the wireless communication interface of the server is activated from the indication message transmitted from the server, and activate the wireless communication interface and configure as connection-ready state (step, S7050).

Later, the client may transmit an Acknowledge message to the server and inform that its own wireless communication interface is activated and in connection-ready state (step, S7060).

The client and the server establish a connection of the wireless communication interface by performing a specific connection procedure of the wireless communication interface (step, S7070).

Through the method using the TDS service as such, the client and the server may establish a connection of other wireless communication network through Bluetooth LE.

Figure 7:
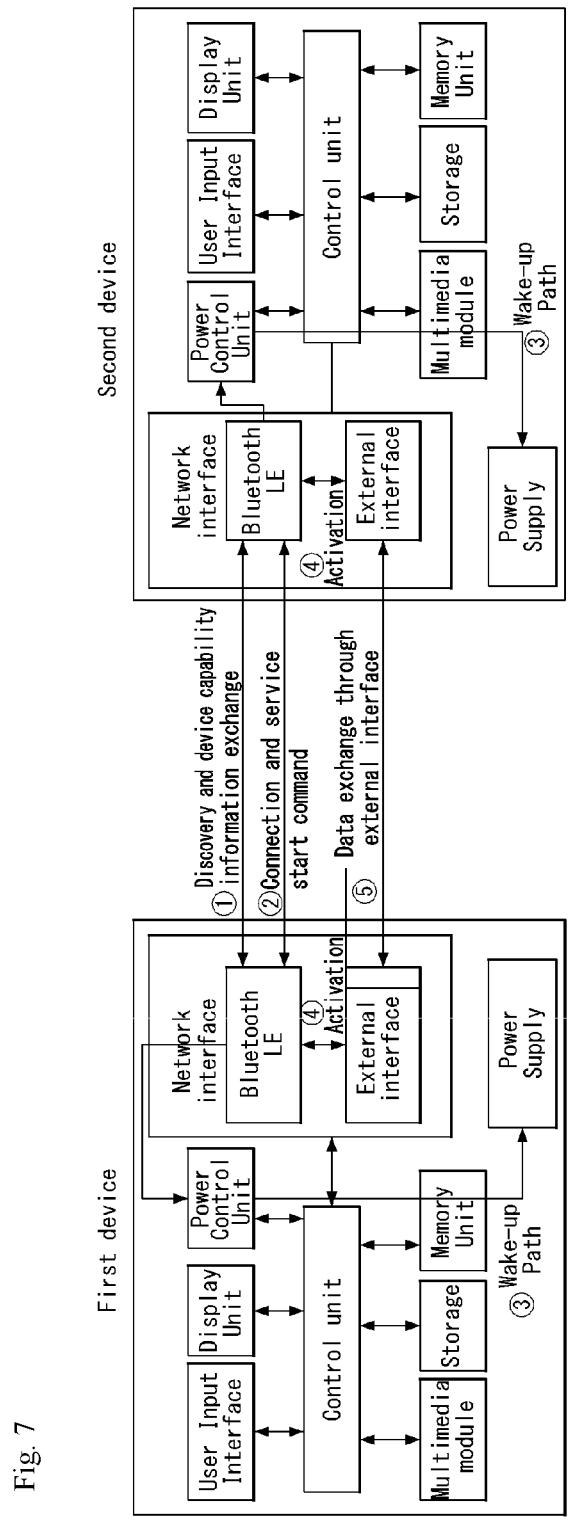
FIG. 7 illustrates an example of an inner operation of a device for performing methods proposed in the present disclosure.

FIG. 7 illustrates an example of an inner operation of a device for performing methods proposed in the present disclosure.

Using FIG. 7, when the main power of a device is turned "OFF", the main power of the device is turned "ON" through Bluetooth LE, and a connection of other wireless communication network except Bluetooth LE may be established.

Each unit and module depicted in FIG. 7 is as follows.

Network interface (Bluetooth LE): A device for low power wireless communication. A device that enables to discover other device to connect or enables to perform a data transmission and reception.

Network interface (external interface): A device for wireless communication. A device that enables to discover other device to connect or enables to perform a data transmission and reception.

Power Control Unit: Manages device power state information (ON, OFF,

Sleep Mode, etc.) and accordingly, controls an operation of Power Supply, a device power state may be changed by BLE communication of other device.

Memory Unit: A selective device implemented in various types of devices, a volatile physical device (e.g., Memory) in which various types of data are stored temporarily.

Control unit: Controls overall operations of a device

Display Unit: Outputs data received through Network interface or data stored in Content Storage to a screen by the control of a Control Unit.

Multimedia module: A device for playing back various types of multimedia, and the Multimedia module may be implemented within a Control Unit, or implemented independently to the Control Unit.

Storage: Physical device (e.g., SD card) of non-volatile property that may store various types of data Power Supply: A device that receives external power source or internal power source by the control of a Control Unit and supplies power source which is required for operation of each constituent element.

As shown in FIG. 7, ① a first device and a second device may discover a counterpart device through Bluetooth LE in a state that a power supply, which is a main power, is turned OFF (inactivated), and obtain information in relation to a wireless communication network and a service supported by the counterpart device by exchanging capability information.

At this time, the discovery and exchange of the capability information may be performed through the Advertising message described above.

② When the first device and the second device are intended to establish a connection through a specific wireless communication interface, the first device and the second device exchange a connection and a start command through a Bluetooth LE module.

③ Later, the Bluetooth LE of the first device and the second device inform an establishment of a connection through a specific wireless communication interface to a Power Control Unit, and the Power Control Unit turns "ON" the main power through a specific path (e.g., Wake-up Path).

④ When the main power is turned "ON", the Bluetooth LE activates the specific wireless communication interface. At this time, for the activation of the specific wireless communication interface, as described in FIG. 6, a Write request message may be transmitted to the counterpart device.

⑤ When the specific wireless communication interface is activated, the first device and the second device may establish a connection by performing a connection procedure of the activated specific wireless communication interface, and exchange data through the established specific wireless communication interface.

Through such a method, all powers except for the Bluetooth LE are turned "OFF" usually, and activated through the Bluetooth LE only if it is required, and there is an effect that power consumption of the device may be decreased.

Figure 8:
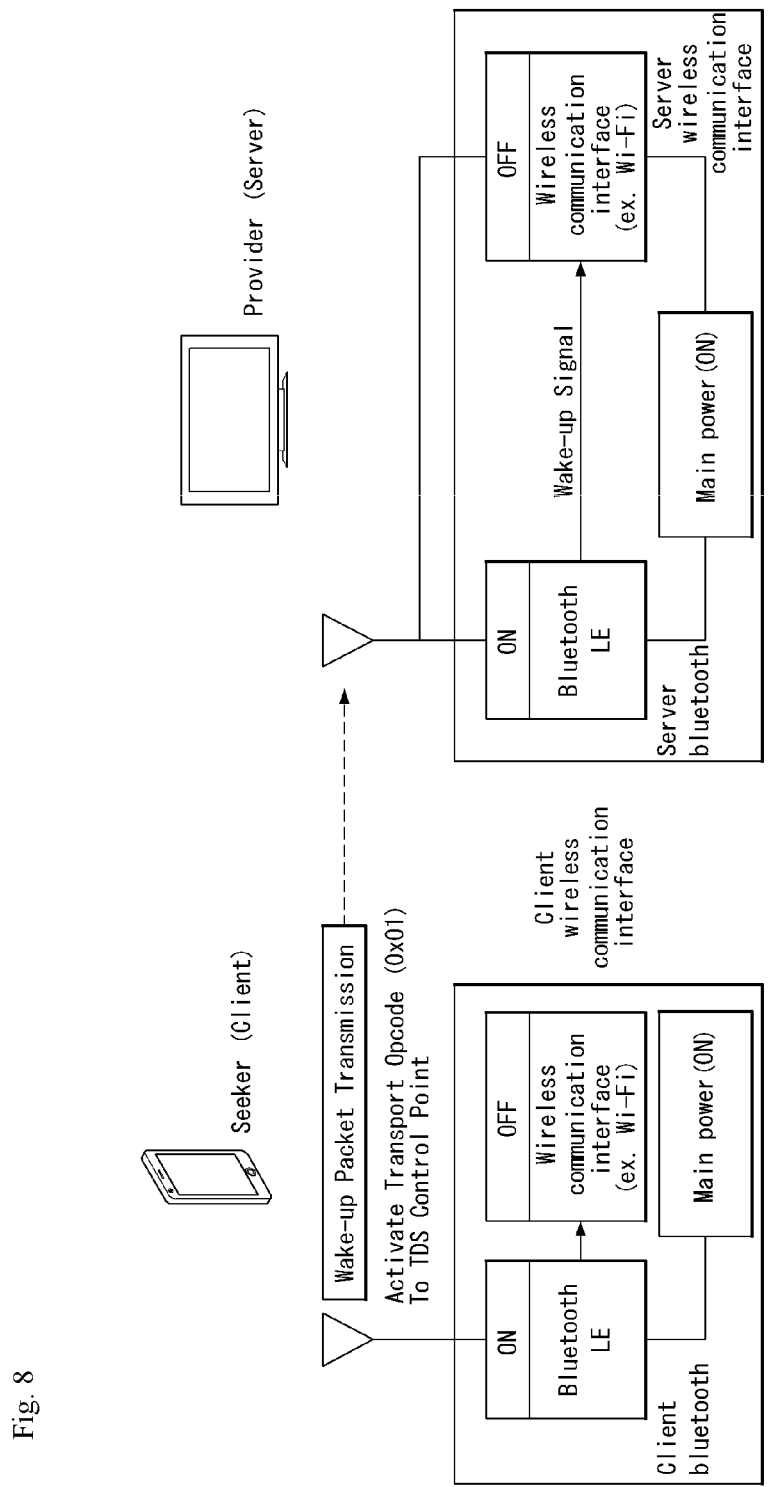
FIG. 8 is a diagram illustrating an example of a method for activating a power of a communication means proposed in the present disclosure.

FIG. 8 is a diagram illustrating an example of a method for activating a power of a communication means proposed in the present disclosure.

Referring to FIG. 8, in the case that only a wireless communication interface of a server and a client is inactivated, the client may establish a connection by activating the wireless communication interface of the server through Bluetooth LE.

Particularly, in FIG. 8, the main power and the Bluetooth LE of the client and the server are turned "ON" always, and only the wireless communication interface is turned "OFF".

In this case, the client may write a specific operation code (e.g., 0x01) to a control point property for activating the wireless communication interface, and activate the wireless communication interface of the server.

For example, the client transmits a Write request message that requests a writing of the specific operation code to the control point property to the server, and the server transmits a Write response message in response to it to the server.

Later, the server activates the wireless communication interface, and transmits an indication message that indicates it.

When the client receives the indication message from the server, the client may activate its own wireless communication interface, and establish a connection of the wireless communication interface by performing a procedure for establishing the wireless communication interface with the server.

Figure 9:
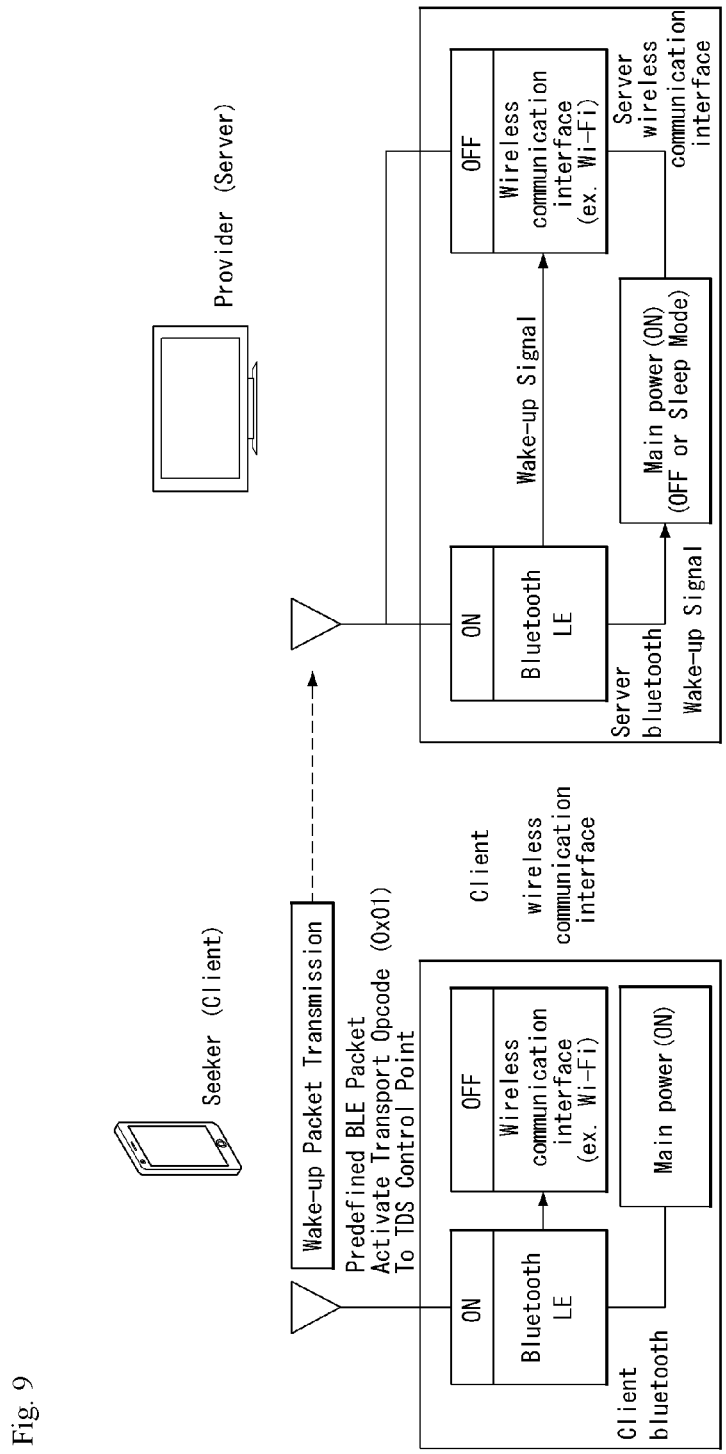
FIG. 9 is a diagram illustrating an example of a method for activating a main power of a device proposed in the present disclosure.

FIG. 9 is a diagram illustrating an example of a method for activating a main power of a device proposed in the present disclosure.

Referring to FIG. 9, in the case that a main power and a wireless communication interface of a server and a client are inactivated, the client may activate the main power and the wireless communication interface of the server through Bluetooth LE, and establish a connection.

Particularly, in FIG. 9, the server is in sleep mode. That is, the main power of the client is turned "ON", but the main power of the client is turned "OFF".

In addition, the Bluetooth LE of the client and the server is turned "ON" always, and the wireless communication interface is turned "OFF".

In this case, in order to change the server to activation mode from the sleep mode, that is, in order to turn "ON" the main power of the server, the client may transmit a predefined specific packet to the server or write a specific operation code for a specific ID to a control point property for activating the main power.

For example, the client transmits a Write request message that requests a writing of the specific operation code for turning "ON" the main power to the control point property to the server, and in response to it, the server transmits a Write response message to the client.

Later, the server activates the wireless communication interface and transmits an indication message that indicates it to the client.

When the main power is turned "ON", the client may establish a connection by activating the wireless communication interface of the server using the method described in FIG. 8.

Through such a method, even in the case that the main power except the Bluetooth LE and the power of the wireless communication means are turned "OFF", the main power and the power of the wireless communication means may be turned "ON".

In addition, the main power except the Bluetooth LE and the power of the wireless communication means are turned "OFF" if it is not required, there is an effect that power consumption of the device may be decreased.

Figure 10:
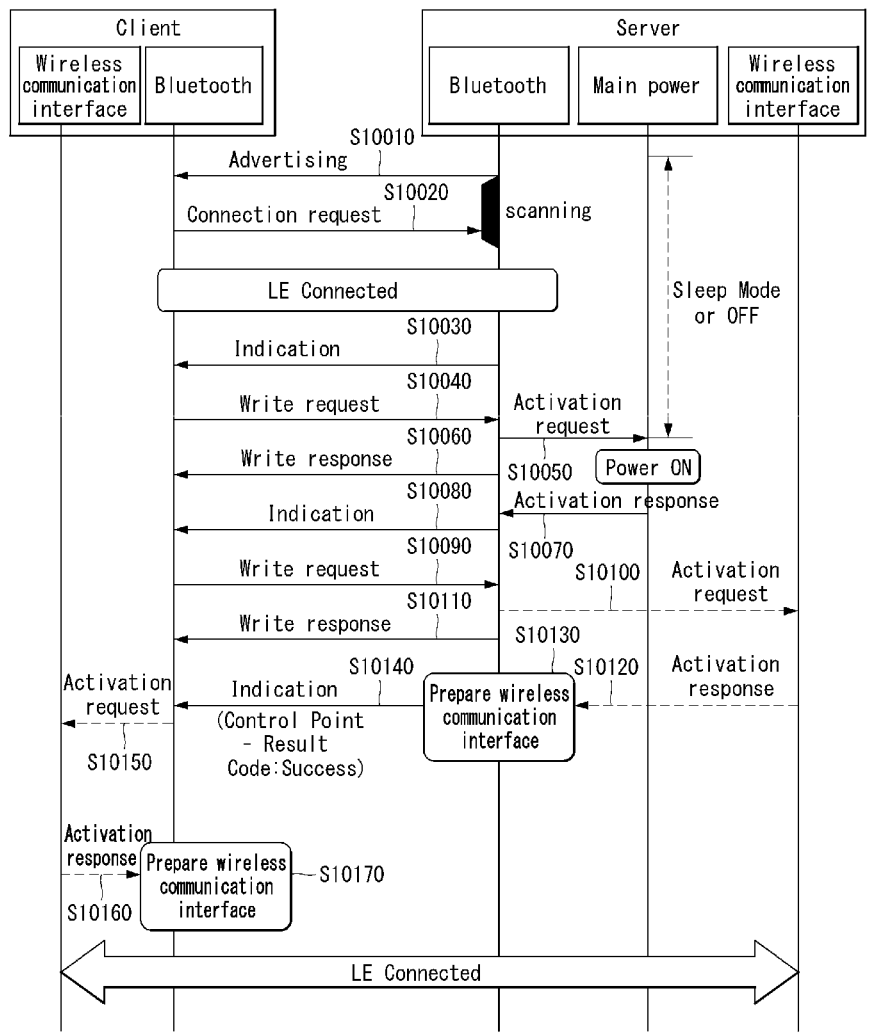
FIG. 10 is a flowchart illustrating an example of a method for establishing a connection of a communication means according to power state of a device proposed in the present disclosure.

FIG. 10 is a flowchart illustrating an example of a method for establishing a connection of a communication means according to power state of a device proposed in the present disclosure.

Referring to FIG. 10, in the case that a main power of a server is turned "OFF" and a wireless communication interface is inactivated, a client may turn "ON" the main power of the server and establish a connection by activating the wireless communication interface.

Particularly, it is assumed that the main power of the server and a wireless communication network except Bluetooth LE are in inactivated "OFF" state in order to minimize power consumption.

The server transmits an Advertising message through the Bluetooth LE such that the client may discover the server (step, S10010). The Advertising message may be broadcasted or unicasted to a specific device.

The client that receives the Advertising message from the server through the Bluetooth LE may discover the server, and transmit a connection request message to establish a Bluetooth LE connection.

The server receives the connection request message transmitted from the client in a scanning period, and establishes a Bluetooth LE connection with the client.

The server transmits an indication message that includes information related to a state of the server to the client through the Bluetooth LE (step, S10030).

The indication message may include first state information indicating a main power state of the server, an identifier for identifying the wireless communication interface supported by the server, second state information indicating a state of the wireless communication interface, a UUID for identifying a service that may be provided by using the wireless communication interface, and the like.

The client identifying that the main power of the server and the wireless communication interface are turned "OFF" through the indication message transmitted from the server performs a procedure for turning "ON" the main power of the server and the power of the wireless communication interface.

Particularly, the client transmits a Write request message that requests a writing of a specific operation code for a specific ID to the control point property for activating the main power to the server (step, S10040).

The server writes the specific operation code to the control point property according to the Write request mess transmitted from the client, and performs an operation for activating the main power.

For example, the Bluetooth LE of the server forwards an activation request message that requests an activation of the main power to the main power through a path for activating the main power (step, S10050).

At this time, the activation request message may be forwarded by using a switch or a relay of hardware.

In addition, the server may transmit a Write response message to the client in response to the Write request message (step, S10060).

The main power of the server is existed in a sleep mode or "OFF" state, and is in activation state or "ON" state when receiving the activation request message. The main power of the server informs that the main power is turned "ON" by forwarding an activation response message to the Bluetooth (step, S10070).

The server informs that the main power is turned "ON" by transmitting an indication message to the client.

For example, the server transmits an indication message of which Result Code for the control point requested from the client is configured as 'Success' to the client (step, S10080).

The client identifying that the main power is turned "ON" through the indication message, in order to activate the wireless communication interface which is intended to connect through the Bluetooth LE, transmits a Write request message that requests a writing of a specific operation code indicating an activation to the control point property for activating the wireless communication interface (step, S10090).

The server writes the specific operation code to the control point property according to the Write request message transmitted from the client, and performs an operation for activating the wireless communication interface.

For example, the Bluetooth LE of the server forwards the activation request message that requests the activation to the wireless communication interface (step, S10100).

In addition, the server may transmit a Write response message to the client in response to the Write request message (step, S10110).

The wireless communication interface of the server is existed in inactivation state or "OFF" state, and when receiving the activation request message, becomes in activation state or "ON" state. The wireless communication interface of the server forwards an activation response message to the Bluetooth, and informs that the wireless communication interface is activated or turned "ON" (step, S10120).

The server activates the wireless communication interface and configures it as a connection-ready state (step, S10130).

The server transmits an indication message to the client and informs that the wireless communication interface is activated and configured as the connection-ready state.

For example, the server transmits an indication message of which Result Code for the control point requested from the client as 'Success' to the client (step, S10140).

The client may identify that the wireless communication interface of the server is activated through the indication message transmitted from the server, and performs a procedure for activating its own wireless communication interface.

For example, the Bluetooth LE of the client forwards an activation request message that requests the activation to the wireless communication interface (step, S10150).

The wireless communication interface of the server is existed in inactivated state or "OFF" state, and when receiving the activation request message, becomes activated state or "ON" state. The wireless communication interface of the server forwards an activation response message to the Bluetooth, and informs that the wireless communication interface is activated or turned "ON" (step, S10160).

The client activates the wireless communication interface and configures as connection-ready state (step, S10170).

The client and the server perform a specific connection procedure of the wireless communication interface and establish a connection of the wireless communication interface.

Figure 11:
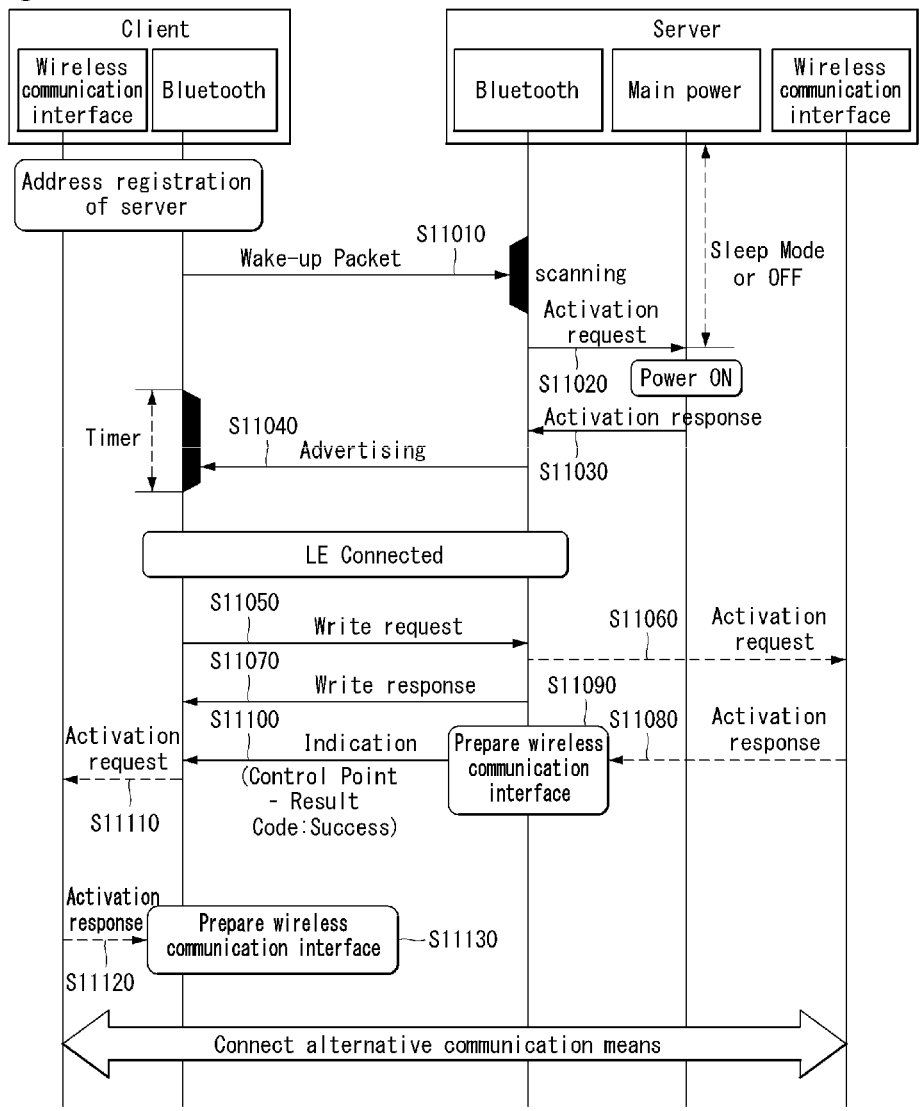
FIG. 11 is a flowchart illustrating another example of a method for establishing a connection of a communication means according to power state of a device proposed in the present disclosure.

FIG. 11 is a flowchart illustrating another example of a method for establishing a connection of a communication means according to power state of a device proposed in the present disclosure.

Referring to FIG. 11, a client may not establish a Bluetooth LE connection with a server, but may activate the main power of the server.

Particularly, it is assumed that the main power of the server and a wireless communication network except Bluetooth LE are in inactivated "OFF" state in order to minimize power consumption.

After bonding, the client and the server generate and exchange a Random Private Address. The client registers an address of the server, and the server registers an address of the client in Whitelist indicating a list of devices.

The Whitelist means a device set used for a link layer of Bluetooth to filter devices. The Whitelist is constructed by a host and filters a notifier, a scanner or an initiator used by a link layer. This enables that a host constructs a link layer and responds to a request without waking up the host. All device filtering policy needs to use the same Whitelist.

Notification filtering policy: The notification filtering policy determines a method for a link layer of a notifier to process a scan and/or a connection request.

Scanner filtering policy: The scanner filtering policy determines a method for a link layer of a scanner to process a notification packet.

Initiator filtering policy: The initiator filtering policy determines a method for a link layer of an initiator to process a notification packet.

In addition, the client and the server configure a specific code for activating or turning "ON" the main power through bonding. That is, after the specific code is configured, when the server receives the preconfigured specific code from the client, the server activates or turns "ON" the main power.

Later, the client transmits a Wake-Up Packet for activating the main power to the server (step, S11010).

The Wake-Up Packet may be broadcasted to a plurality of servers or unicasted to specific server only, and also transmitted with being included in an Advertising message.

The Wake-Up Packet may include an address of the client, a specific code indicating an activation of the main power and a UUID.

The client transmits the Wake-Up Packet to the server, and operates a timer. In the case that a response to the Wake-Up Packet is not received from the server until the timer expires, the client may determine that the Wake-Up Packet is not transmitted to the server, and terminate the procedure or transmit the Wake-Up Packet again.

Since the specific code is transmitted from the client, the server performs an operation for activating the main power.

For example, the Bluetooth LE of the server forwards an activation request message that requests activation of the main power to the main power through a path for activating the main power (step, S11020).

At this time, the activation request message may be forwarded by using a switch or a relay of hardware.

The main power of the server is existed in a sleep mode or "OFF" state, and is in activation state or "ON" state when receiving the activation request message. The main power of the server informs that the main power is turned "ON" by forwarding an activation response message to the Bluetooth (step, S11030).

The server informs that the main power is turned "ON" by transmitting an Advertising message to the client (step, S11040).

The Advertising message may include first state information indicating a main power state of the server, an identifier for identifying the wireless communication interface supported by the server, second state information indicating a state of the wireless communication interface, a UUID for identifying a service that may be provided by using the wireless communication interface, and the like.

In the case that the client receives the Advertising message from the server until the timer expires, the client determines that the Wake-Up Packet is successfully transmitted.

The client may identify that the main power of the server is activated through the Advertising message and the supported wireless communication interface and service.

Later, the client and the server establish a Bluetooth LE connection.

The client that establishes the Bluetooth LE connection with the server, in order to activate the wireless communication interface which is intended to connect through the Bluetooth LE, transmits a Write request message that requests a writing of a specific operation code indicating activation to the control point property for activating the wireless communication interface (step, S11050).

The server writes the specific operation code to the control point property according to the Write request message transmitted from the client, and performs an operation for activating the wireless communication interface.

For example, the Bluetooth LE of the server forwards the activation request message that requests the activation to the wireless communication interface (step, S11060).

In addition, the server may transmit a Write response message to the client in response to the Write request message (step, S11070).

The wireless communication interface of the server is existed in inactivation state or "OFF" state, and when receiving the activation request message, becomes in activation state or "ON" state. The wireless communication interface of the server forwards an activation response message to the Bluetooth, and informs that the wireless communication interface is activated or turned "ON" (step, S11080).

The server activates the wireless communication interface and configures it as a connection-ready state (step, S11090).

The server transmits an indication message to the client and informs that the wireless communication interface is activated and configured as the connection-ready state.

For example, the server transmits an indication message of which Result Code for the control point requested from the client as 'Success' to the client (step, S11100).

The client may identify that the wireless communication interface of the server is activated through the indication message transmitted from the server, and performs a procedure for activating its own wireless communication interface.

For example, the Bluetooth LE of the client forwards an activation request message that requests the activation to the wireless communication interface (step, S11110).

The wireless communication interface of the server is existed in inactivated state or "OFF" state, and when receiving the activation request message, becomes activated state or "ON" state. The wireless communication interface of the server forwards an activation response message to the Bluetooth, and informs that the wireless communication interface is activated or turned "ON" (step, S11120).

The client activates the wireless communication interface and configures as connection-ready state (step, S11130).

The client and the server perform a specific connection procedure of the wireless communication interface and establish a connection of the wireless communication interface.

Figure 12:
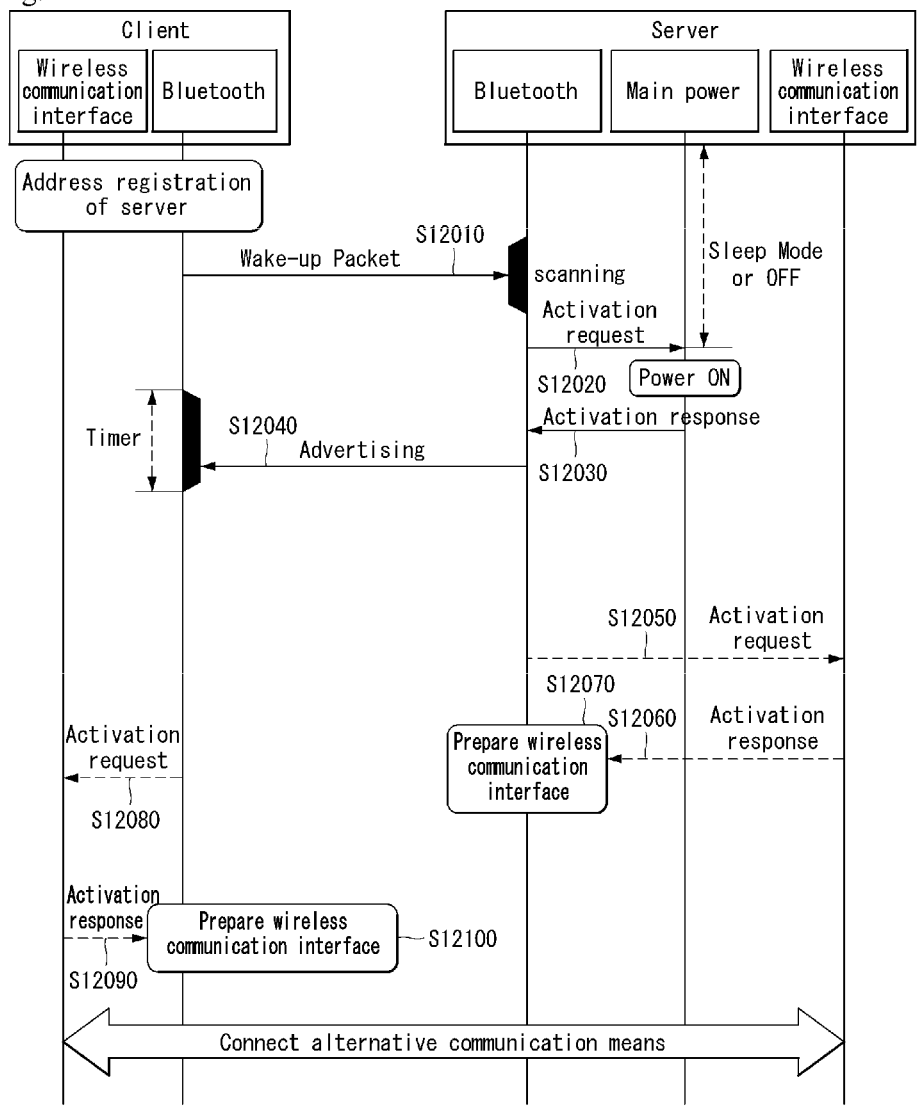
FIG. 12 is a flowchart illustrating another example of a method for establishing a connection of a communication means according to power state of a device proposed in the present disclosure.

FIG. 12 is a flowchart illustrating another example of a method for establishing a connection of a communication means according to power state of a device proposed in the present disclosure.

Referring to FIG. 12, a client may not establish a Bluetooth LE connection with a server, but may establish a connection of a wireless communication interface by activating the main power of the server and the power of the wireless communication interface.

First, since step S12010 to step S12040 are the same as step S11010 to step S11040 of FIG. 11, the repeated description will be omitted.

The server informing that the main power is activated by transmitting the Advertising message performs an operation for activating the wireless communication interface.

For example, the Bluetooth LE of the server forwards the activation request message that requests the activation to the wireless communication interface (step, S12050).

The wireless communication interface of the server is existed in inactivation state or "OFF" state, and when receiving the activation request message, becomes in activation state or "ON" state. The wireless communication interface of the server forwards an activation response message to the Bluetooth, and informs that the wireless communication interface is activated or turned "ON" (step, S12060).

The server activates the wireless communication interface and configures it as a connection-ready state (step, S12070).

Similar to the server, the client performs a procedure for activating its own wireless communication interface.

For example, the Bluetooth LE of the client forwards an activation request message that requests the activation to the wireless communication interface (step, S12080).

The wireless communication interface of the server is existed in inactivated state or "OFF" state, and when receiving the activation request message, becomes activated state or "ON" state. The wireless communication interface of the server forwards an activation response message to the Bluetooth, and informs that the wireless communication interface is activated or turned "ON" (step, S12090).

The client activates the wireless communication interface and configures as connection-ready state (step, S12100).

The client and the server perform a specific connection procedure of the wireless communication interface and establish a connection of the wireless communication interface.

FIGS. 13 to 15 are diagrams illustrating an example of a message and its property proposed in the present disclosure.

FIG. 13 illustrates an example of a packet format of the Advertising message described in FIG. 7 to FIG. 12.

FIG. 13 shows the main power state of a device according to bits of TDS flags of the Advertising message.

Table 2 below represents an example of the main power state of a device according to bits of TDS flags.

TABLE 2

| Device Power State | Description |
| --- | --- |
| 0b000 | OFF |
| 0b001 | ON |
| 0b010 | Sleep Mode |

Organization ID field represents a wireless communication means supported by a device.

Transport Data field includes data related to the supported wireless communication means. For example, Transport Data field may include service information indicating a service supportable through the wireless communication interface, type information indicating a type of the device and power state information indicating a power state of the wireless communication interface.

Table 3 below represents an example of power state information according to bit.

TABLE 3

| State | Description |
| --- | --- |
| 0b00 | OFF |
| 0b01 | ON |
| 0b10 | ON and Busy |
| 0b11 | RFU |

Table 4 below represents an example of type information according to bit.

TABLE 4

| Device Type | Description |
| --- | --- |
| 0x00 | None |
| 0x01 | TV |
| 0x02 | Speaker |
| 0x03 | Camera |
| 0x04~ | RFU |

FIG. 13 shows Wi-Fi as an example of the wireless communication interface, but the wireless communication interface may also include Bluetooth BR/EDR, Wi-Fi Direct, NFC, Zigbee, and the like as well as Wi-Fi.

FIG. 14 illustrates the TDS service and its property described in FIG. 6 to FIG. 12.

Referring to FIG. 14, the client may readout the property of the server, and may obtain or write the information stored in the server such that the server may perform a specific operation.

FIG. 14(a) shown an example of a service proposed in the present invention. As shown in FIG. 14(a), the Service Name of TDS service may be Transport Discovery, and its UUID value may be 0x1824.

FIG. 14(b) shown an example of a property proposed in the present invention. Each property shown in FIG. 14(b) is as below.

Device Power State: A property representing the main power state of a device, and having "ON", "OFF" or "Sleep Mode" value depending on the main power state of a device.

Wi-Fi Handover Data: A property including data for handover, when handover from Bluetooth LE to Wi-Fi is performed.

Wi-Fi Alliance Data: A property representing Descriptors including data related to Wi-Fi Alliance Complete Wi-Fi Transport Data Descriptor: A descriptor including data related to Wi-Fi Alliance Control Point: A property for indicating a specific operation to a server FIG. 15 illustrates an example of the Control Point property shown in FIG. 14(b). The client may request a writing of an Op code indicating a specific operation to the Control Point property of the server, and accordingly, may control the server to perform the specific operation.

The Control Point property may include an Op code field, an Organization ID field and a Parameter field, and each field is as below.

Op code field: A code for indicating a specific operation, and performs a specific operation according to the written value. For example, when a client writes value 0x01 in the Op Code field of the Control Point property of the server, the server activates the Transport indicating a wireless communication interface.

Organization ID field: A field including Organization ID.

Parameter field: A field including a parameter related to a wireless communication interface.

The client may activate or inactivate the main power of the server and the power of the wireless communication interface through the writing of the Op Code to the Control Point.

Figure 16:
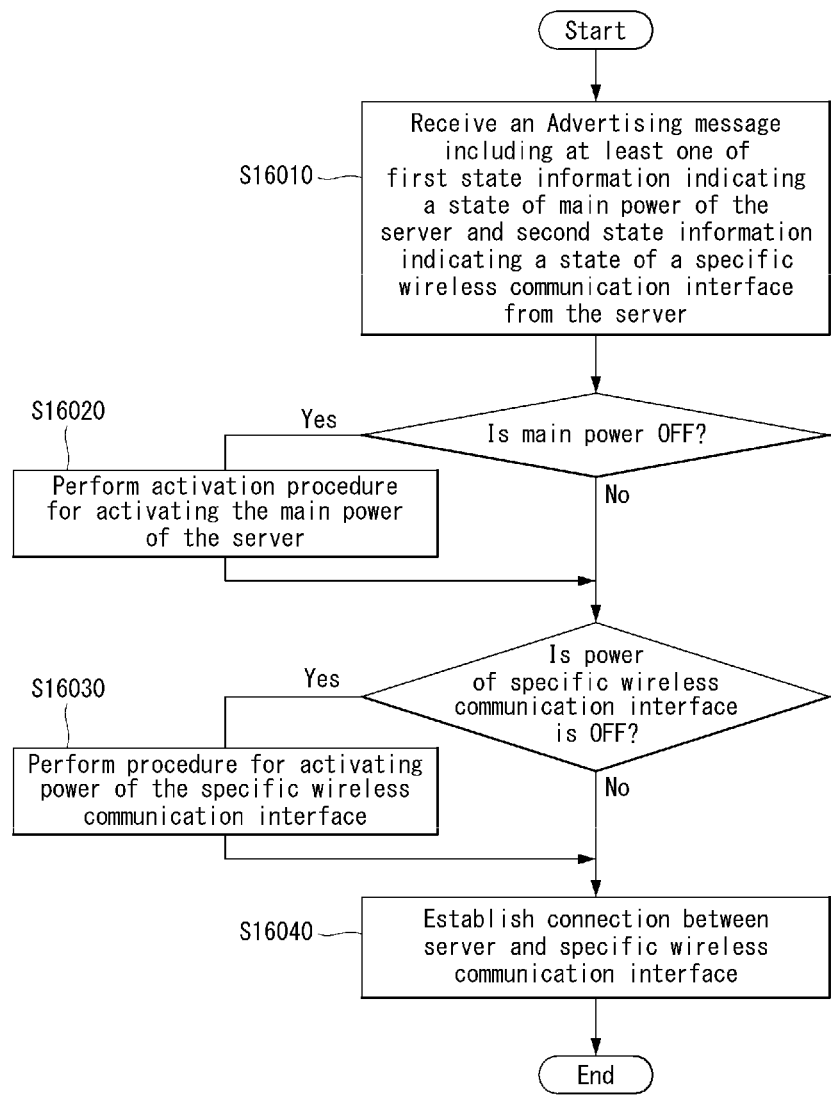
FIG. 16 is a flowchart illustrating an example of a method for establishing a connection by a client according to a power state of a server proposed in the present disclosure.

FIG. 16 is a flowchart illustrating an example of a method for establishing a connection by a client according to a power state of a server proposed in the present disclosure.

Referring to FIG. 16, the client may establish a connection by activating a main power and a power of a specific wireless communication interface according to the main power of the server and the power state of the specific wireless communication interface.

Particularly, the client receives an Advertising message including at least one of first state information indicating a state of main power of the server and second state information indicating a state of a specific wireless communication interface from the server (step, S16010).

The Advertising message may further include device type information, a UUID, and the like, in the same way as the Advertising message described in FIG. 6 to FIG. 13.

The client may determine whether the main power state of the server is "OFF" or inactivated based on the first state information of the received Advertising message.

In the case that the main power is "OFF" or inactivated, the client turns "ON" or activates the main power by performing the procedure described in FIG. 9 to FIG. 12.

That is, the client may turn "ON" or activate the main power of the server by transmitting a preconfigured Wake-up Packet to the server or writing a first Op code for activating the main power to the control property of the server (step, S16020).

At this time, the Wake-up Packet may have the same structure as the Wake-up Packet described in FIG. 11 and FIG. 12, and transmitted with being included in the Advertising message.

In addition, the control point property and the request message for requesting a writing of the first Op code to the control property may have the same structure as the Write request message described in FIG. 10.

In the case that the main power is "ON" or activated, the client may determine whether the power state of a specific wireless communication interface is "OFF" or inactivated based on the second power information.

In the case that the main power is "OFF" or inactivated, the client turns "ON" or activates the power of the specific wireless communication interface by performing the procedure described in FIG. 9 to FIG. 12 (step, S16030).

That is, the client may a Write request message that requests a writing of the second Op code for activating the specific wireless communication interface to the control point property to the server.

The client may receive a Write response message in response to the Write request message from the server.

Later, the client may receive a first indication message including a first result code indicating whether the specific wireless communication interface is activated from the server.

At this time, in the same way as that of described in FIG. 10 and FIG. 11, in the first result code, the writing result for the control point requested from the client may be configured as 'Success'.

The client identifying that the power of the specific wireless communication interface is activated through the first indication message may establish a connection between the server and the specific wireless communication interface through the procedure for connecting the specific wireless communication interface, and transmit and receive data through the established wireless communication interface (step, S16040).

Figure 17:
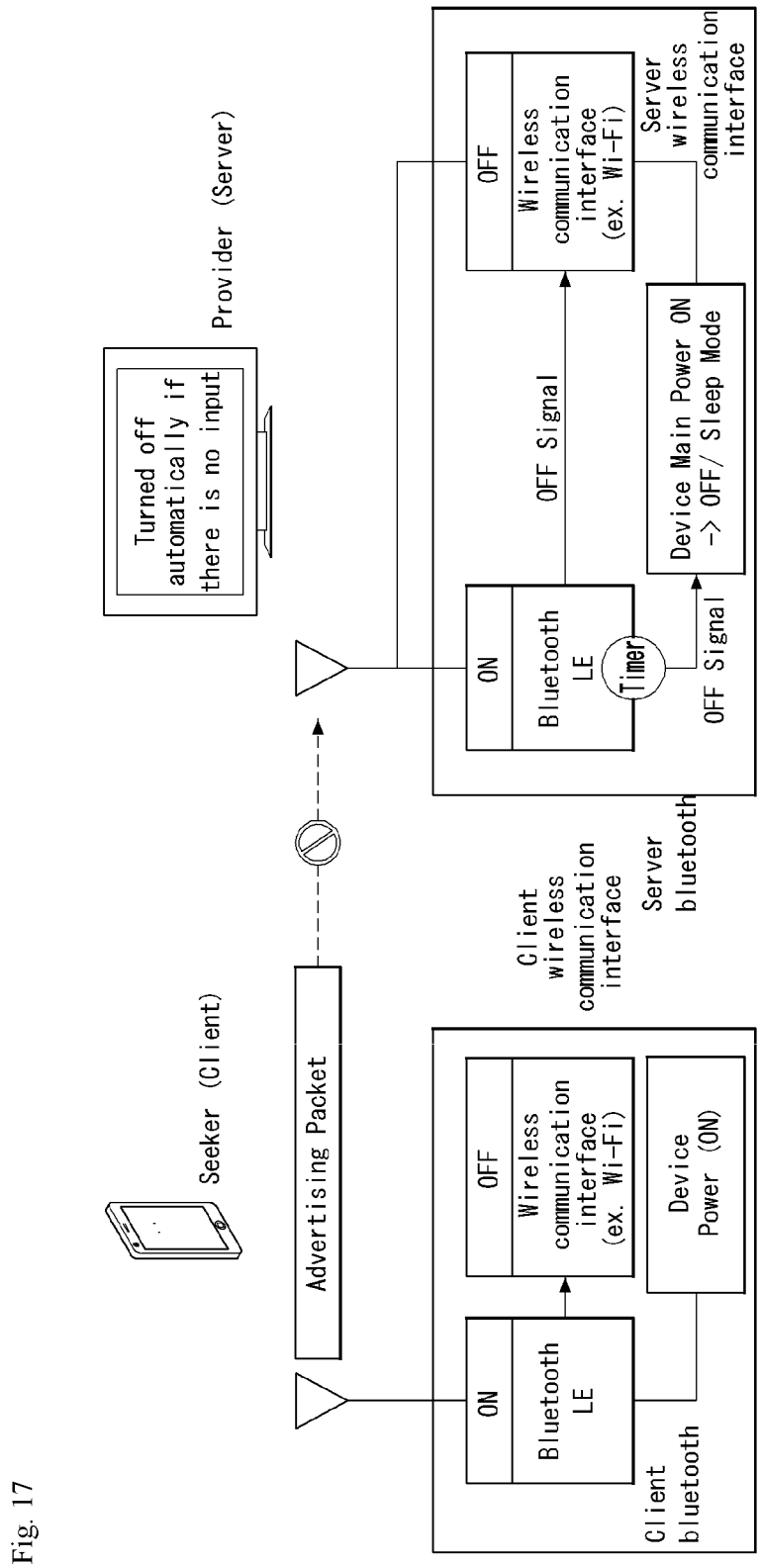
FIG. 17 is a diagram illustrating an example of a method for changing a power state of a device proposed in the present disclosure.

FIG. 17 is a diagram illustrating an example of a method for changing a power state of a device proposed in the present disclosure.

Referring to FIG. 17, in the case that message transmission and reception from a client is stopped, a server may release a connection with the client and turn "OFF" or inactivate a main power and a power of a wireless communication interface.

Particularly, in the case that the client gets out of the area in which a communication may be performed with the server or the client is in a state of unable to perform a communication, the server is not required to maintain the connection with the client anymore.

Accordingly, the server may determine whether the client is in the area in which communication is available with the server or whether the client is in a state of able to transmit and receive data persistently with the server.

For example, after the server establishes a connection through a specific wireless communication interface with the client, the server may activate a specific timer. In the case that there is a transmission through the Bluetooth LE or the specific wireless communication interface from the client before the specific timer expires, the server may initiate the timer again, and transmit and receive data with the client persistently.

However, in the case that an Advertising message or a specific packet is not transmitted through the Bluetooth LE from the client until the specific timer expires and a message is not transmitted through the specific wireless communication interface, the server determines that the server is not required to maintain a connection with the client anymore.

Accordingly, the server releases a connection with the client and changes the main power to "sleep mode" or "OFF" state.

In addition, the server also inactivates the power of the specific wireless communication interface.

Through such a method, in the case that the server is not required to activate the main power and the power of wireless communication network except the Bluetooth LE, the server may reduce power consumption by turning "OFF" or inactivating the main power and the power of wireless communication network except the Bluetooth LE.

FIG. 18 is a diagram illustrating an example of a method for controlling a power state of a device proposed in the present disclosure.

As shown in FIG. 27(a), devices such as a TV, a headset, a band, a projector, and the like include various wireless interfaces.

For example, a TV may include a wireless communication interface for Bluetooth BR/EDR, Bluetooth LE, Wi-Fi, NFC, or Wi-Fi Direct, and a headset may include a wireless communication interface for Bluetooth BR/EDR or Bluetooth LE.

A client and a server may be connected through Bluetooth LE, and the client may obtain and output a power state of wireless communication interface of each server as shown in FIG. 18(b) through the Bluetooth LE.

A user may select the power of wireless communication interface of the server and the main power of the server through the UI displayed on the client and turn "ON" or "OFF".

Figure 19:
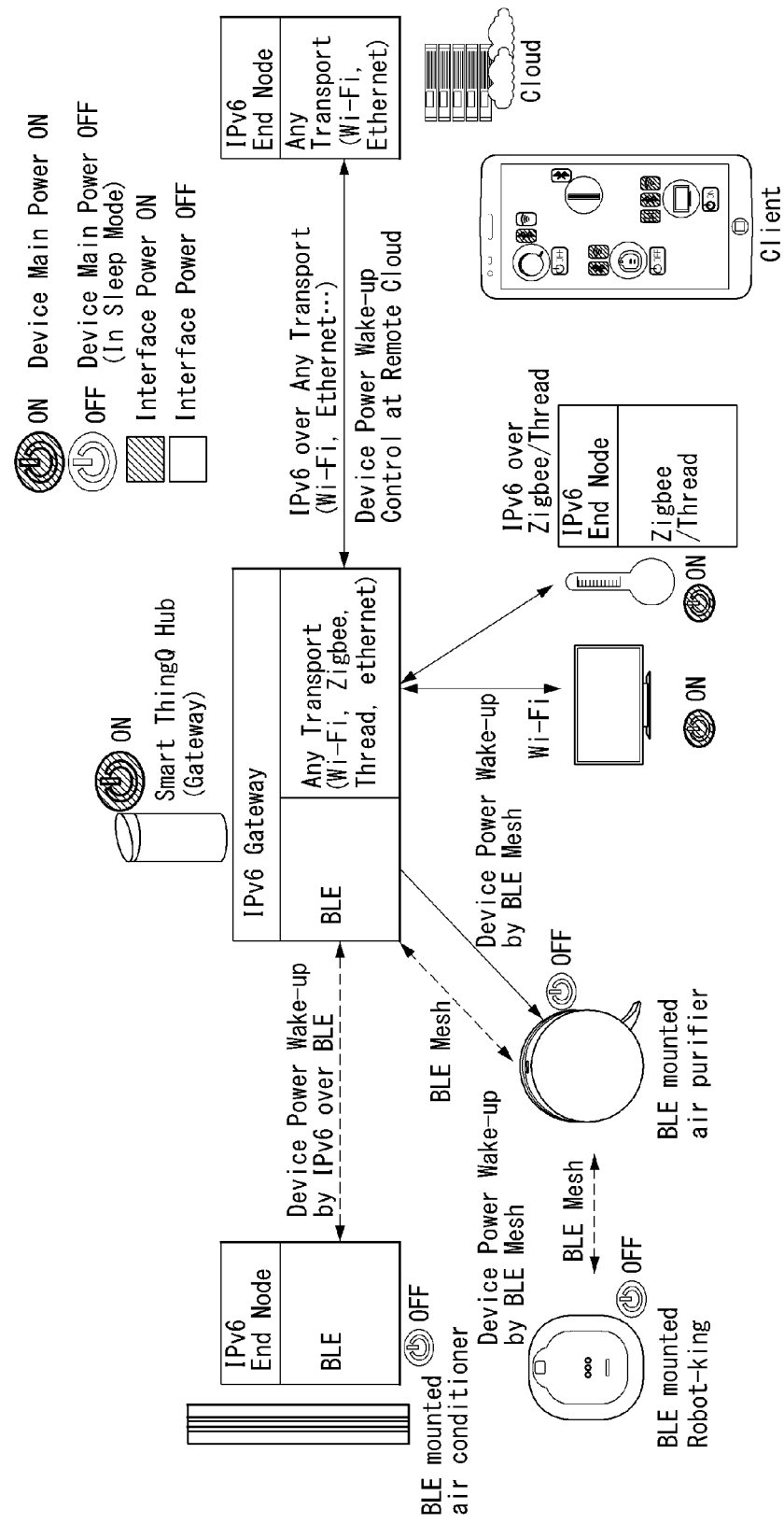
FIG. 19 is a diagram illustrating another example of a method for controlling a power state of a device proposed in the present disclosure.

FIG. 19 is a diagram illustrating another example of a method for controlling a power state of a device proposed in the present disclosure.

Referring to FIG. 19, a client may obtain and control states of main power of a plurality of servers and states of wireless communication interfaces through a gateway.

Particularly, as shown in FIG. 19, the devices that support various wireless communication interfaces (e.g., Bluetooth LE, Wi-Fi and Zigbee) in a home network may transmit and receive data through the various wireless communication interfaces with the gateway.

For example, as shown in FIG. 19, the Robot-king and the air purifier that are mounted with Bluetooth LE may transmit and receive data through Bluetooth Mesh with the gateway. That is, the Robot-king, the air purifier and the gateway establish a Bluetooth Mesh network, and the Robot-king may transmit and receive data with the gateway through the air purifier.

The client may perform a communication with the gateway by using remote wireless communication interface (e.g., 3G, LTE, LTE-A or Wi-Fi), and may control the main power of the devices and the wireless communication interfaces that construct a home network through the gateway.

Through such a method, even in the case that the client is in exterior, the client may control the power of the server through the gateway, and there is an effect that power consumption of the server may be reduced.

The invention proposed in the present disclosure is described based on Bluetooth LE, but also applicable to Bluetooth BR/EDR.

Further, for the convenience of description, the drawings are divided and described, but it is also available to design so as to implement a new embodiment by combining the embodiments described in each drawing. In addition, it is also belonged to the scope of the present invention to design a record medium in which the program for executing the embodiments described above is recorded, which is readable in a computer as a necessity of a person in the art.

In the present invention described so far, the construction and the method of the embodiments described above are not limitedly applied, but a part or the whole of each of the embodiments may be selectively combined and constructed so as to form various modifications.

In addition, a method according to the present invention may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like for example and also include such a carrier-wave type implementation as transmission via the Internet. Furthermore, as the processor-readable recording medium is distributed to a computer system connected via a network, processor-readable code may be saved and executed according to a distributive system.

It will be appreciated by those skilled in the art that various modifications and variations may be made in the present invention without departing from the spirit or scope of the invention. Thus, it is intended that the present invention cover the modifications and variations of this invention provided they come within the scope of the appended claims and their equivalents.

Both apparatus and method inventions are mentioned in this specification and descriptions of both of the apparatus and method inventions may be complementarily applied to each other.

INDUSTRIAL APPLICABILITY

The data transmission and reception method of the present invention is described with being focused on the example applied to Bluetooth LE, but also applied to various wireless communication systems except the Bluetooth LE system.

The invention claimed is:

1. A method for establishing a connection of wireless interface with a server using Bluetooth Low Energy (LE), the method performed by a client and comprising:

receiving, from the server, a first advertising message including at least one of first state information indicating a state of main power of the server and second state information indicating a state of a specific wireless communication interface;

performing an activation procedure of the main power based on the first state information;

transmitting, to the server, a first write request message requesting writing of a first operation code of control point property for activating the specific wireless communication interface;

receiving a first write response message in response to the first write request message;

receiving, from the server, a first indication message including a first result code indicating whether the specific wireless communication interface is activated; and establishing a connection with the specific wireless communication interface, when the specific wireless communication interface is activated, wherein the step of performing the activation procedure of the main power includes:

transmitting, to the server, a second advertising message including a specific code indicating the activation of the main power;

receiving, from the server, a third advertising message including third state information indicating a power state of the main power; and establishing the Bluetooth LE connection with the server, and wherein the method further comprises:

establishing a bonding with the server;

generating a first arbitrary address for identifying the client; and exchanging a second arbitrary address for identifying the first arbitrary address from the server with the server.

2. The method of claim 1, wherein the first advertising message further includes at least one of an identifier indicating the specific wireless communication interface or a service Universal Unique Identifier (UUID) indicating a service available to be provided through the specific wireless communication interface.

3. The method of claim 1, wherein the step of performing the activation procedure includes:

establishing the Bluetooth LE connection with the server;

transmitting, to the server, a second write request message requesting writing of a second operation code of the control point for activating the main power;

receiving, from the server, a second write response message in response to the second write request message; and receiving, from the server, a second indication message including a second result code indicating whether the main power is activated.

4. The method of claim 1, further comprising:

generating the specific code; and transmitting, to the server, a message including code information indicating that the generated specific code indicates the activation of the main power.

5. The method of claim 1, wherein the first advertising message further includes list information indicating at least one wireless communication interface except the Bluetooth LE supported by the server and service information indicating a service available to be provided using each of the at least one wireless communication interface.

6. A client for establishing a connection of wireless interface with a server using Bluetooth Low Energy (LE), the client comprising:

a communication unit configured to communicate with at least one external device in wireless or wired manner; and a processor functionally connected to the communication unit, wherein the processor is configured to:

receive, from the server, a first advertising message including at least one of first state information indicating a state of main power of the server and second state information indicating a state of a specific wireless communication interface;

perform an activation procedure of the main power based on the first state information;

transmit, to the server, a first write request message requesting writing of a first operation code of control point property for activating the specific wireless communication interface;

receive a first write response message in response to the first write request message;

receive, from the server, a first indication message including a first result code indicating whether the specific wireless communication interface is activated; and establish a connection with the specific wireless communication interface, when the specific wireless communication interface is activated, wherein the processor transmits, to the server, a second advertising message including a specific code indicating the activation of the main power;

receives, from the server, a third advertising message including third state information indicating a power state of the main power; and establishes the Bluetooth LE connection with the server, and wherein the processor establishes a bonding with the server;

generates a first arbitrary address for identifying the client; and exchanges a second arbitrary address for identifying the first arbitrary address from the server with the server.

7. The client of claim 6, wherein the processor establishes the Bluetooth LE connection with the server;

transmits, to the server, a second write request message requesting writing of a second operation code of the control point for activating the main power;

receives, from the server, a second write response message in response to the second write request message; and receives, from the server, a second indication message including a second result code indicating whether the main power is activated.

8. The client of claim 6, wherein the processor generates the specific code; and transmits, to the server, a message including code information indicating that the generated specific code indicates the activation of the main power.

* * * * *